United States Patent
Sharma

(10) Patent No.: US 7,937,687 B2
(45) Date of Patent: May 3, 2011

(54) GENERATING VOICE EXTENSIBLE MARKUP LANGUAGE (VXML) DOCUMENTS

(75) Inventor: Rajesh Sharma, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1279 days.

(21) Appl. No.: 11/469,629

(22) Filed: Sep. 1, 2006

(65) Prior Publication Data

US 2008/0126941 A1    May 29, 2008

(51) Int. Cl.
*G06F 9/44* (2006.01)

(52) U.S. Cl. ........ 717/106; 717/110; 717/114; 717/117; 717/115

(58) Field of Classification Search ............ 717/106
See application file for complete search history.

(56) References Cited

U.S. PATENT DOCUMENTS

| | | | |
|---|---|---|---|
| 6,766,298 B1 * | 7/2004 | Dodrill et al. | 704/270.1 |
| 2004/0205614 A1 * | 10/2004 | Keswa | 715/523 |
| 2005/0125232 A1 * | 6/2005 | Gadd | 704/270.1 |
| 2005/0149331 A1 * | 7/2005 | Ehrlich | 704/270.1 |
| 2007/0280216 A1 * | 12/2007 | Sabat et al. | 370/356 |

* cited by examiner

*Primary Examiner* — Thomas K Pham

(57) ABSTRACT

A system receives a design document, parses the design document into voice extensible markup language (VXML) elements, and creates a VXML document from the parsed VXML elements.

18 Claims, 18 Drawing Sheets

| GetPIN | | | |
|---|---|---|---|
| PREVIOUS: GetAccountNumber | | | |
| Pre-condition | | Action | |
| If ivr_pin_required = y and ivr_pin has a value | | Continue in this Dialog State | |
| Otherwise | | Go to: ChooseFunction | |
| Prompts | | | |
| Condition | Name | Wording | Barge-in |
| Initial common | next | [Next,] | yes |
| Initial customized (fixed # digits in PIN) | pin_initial4_cust pin_inital16_cust | say or key-in your <4...16>-digit personal identification number | yes |
| Initial customized (variable # digits in PIN) | pin_initialvar_cust | say or key-in your <4...16>-digit personal identification number | yes |
|  | <min> | <min> |  |
|  | to | to |  |
|  | <max> | <max> |  |
|  | digitslong | digits long |  |
| Timeout 1 (fixed) | nsp_prefix1 | [I'm sorry, I didn't hear anything.] | yes |

415 — GetPIN / PREVIOUS row
420 — Pre-condition/Action rows
425 — Prompts section
430 — Initial customized (fixed # digits in PIN)
435 — Initial customized (variable # digits in PIN)
440 — Timeout 1 (fixed)

```
<vxml version="2.0" application="/ngn/vxml2/main.vxml">
      <property name="universals" value="help"/>                    ⎱ 445
      <var name="baseUrl" expr=" '/service/_SERVICENAME_'"/>
      <var name="help_count" expr="0"/>
<form id="entry0">
      <var name="iMaxErrors" expr="0" />
      <block>
                <audio expr="pin_initial4_prd_.wav"/>   ⎱ 450
                <audio expr="pin_initial16_prd_.wav"/>
      </block>
      <field name="choice" type="boolean">       ⎱ 455
            <noinput count="1">
                  <assign name="iMaxErrors" expr="iMaxErrors + 1"/>
                  <if cond="iMaxErrors==3">
                        <throw event="maxTries"/>
                  </if>                                              ⎱ 460
                        <audio expr="pin_4_.wav"/>
                        <audio expr="pin_16_.wav"/>
                  <prompt>
            </noinput>
            <noinput count="2">
                  <assign name="iMaxErrors" expr="iMaxErrors + 1"/>
                  <if cond="iMaxErrors==3">
                        <throw event="maxTries"/> ...                ⎱ 465
```

```
<vxml version="2.0" application="/ngn/vxml2/main.vxml">
    <property name="universals" value="help"/>           ⎫
    <var name="baseUrl" expr=" '/service/_SERVICENAME_'"/> ⎬ 445
    <var name="help_count" expr="0"/>                     ⎭
<script>
    <![CDATA[                                             ⎫
    var nsp_prefix1 = {"tts": "I m sorry I didn t hear anything", ... ⎬
    var nsp_prefix3 = {"tts": "I m not sure if you said anything", ...⎬ 470
    var help_direct = {"tts": "For more information say help", ...    ⎭
    ]]>
<script>
<form id="entry0">
    <var name="iMaxErrors" expr="0" />
    <block>
            <audio expr="pin_initial4_prd_.wav"/>   ⎫
            <audio expr="pin_initial16_prd_.wav"/>  ⎬ 450
            ...                                     ⎭
```

GENERATING VOICE EXTENSIBLE MARKUP LANGUAGE (VXML) DOCUMENTS

BACKGROUND INFORMATION

Interactive voice response (IVR) refers to a computerized system that allows a user, typically a telephone caller, to select an option from a voice menu or otherwise interface with a computer system. Generally, the system plays pre-recorded voice prompts to which the user responds by either pressing a number on a telephone keypad or speaking to the system.

Voice extensible markup language ("VoiceXML" or "VXML") is an open standard developed by the World Wide Web Consortium (W3C) for IVR applications. An IVR application user interface may be documented in a portion (e.g., a dialog design portion) of a design document (e.g., a Service Design Document or "SDD"). A SDD may include an application summary, application call flows, application specification requirements, and dialog design for an IVR application. The dialog design portion of the SDD may be used to show what the IVR application will do and how it will behave. The dialog design portion may be used to build the IVR application in the form of VXML documents. The VXML documents may include VXML elements that conform to the specifications recommended by W3C.

The dialog design portion of the SDD may be arranged in tables (e.g., in a spreadsheet or in a table provided in a word processing document) that contain VXML element properties. For example, the tables may include the following VXML element properties: (1) a previous dialog state; (2) type of grammar to be activated during the dialog state; (3) prompts to play during transitioning from a previous dialog state; (4) prompts to play during an initial dialog state; (5) "no speech" (nothing spoken) timeout prompts; (6) "no match" (something spoken outside of the grammar) timeout prompts; (7) "help" prompts; and/or (8) a next dialog state.

Conventionally, an IVR designer or programmer manually creates VXML documents for an IVR application from a design document. Generally, this involves the programmer reading the design document and creating VXML documents that implement the dialog design portion of the design document. This may be very time consuming and may cause erroneous dialog design to be input by the programmer in the VXML documents.

BRIEF DESCRIPTION OF THE DRAWINGS

The accompanying drawings, which are incorporated in and constitute a part of this specification, illustrate one or more embodiments of the invention and, together with the description, explain aspects of the invention. In the drawings:

FIG. 4B is a diagram of an exemplary portion of the design document of FIG. 4A;

FIGS. 4C and 4D are diagrams of exemplary portions of the VXML document of FIG. 4A;

DETAILED DESCRIPTION

The following detailed description of the invention refers to the accompanying drawings. The same reference numbers in different drawings may identify the same or similar elements. Also, the following detailed description does not limit the invention.

Implementations described herein may provide systems and methods for automatically generating a VXML document(s) from a portion (e.g., a dialog design portion) of a design document(s) (e.g., a SDD) for a speech recognition IVR application. The design portion may describe the desired VXML elements for the VXML document(s), and the VXML document(s) may follow the specifications recommended by the W3C for a particular version of VXML (e.g., VoiceXML 2.0 and/or 2.1). The automatically generated VXML document(s) may be deployed on a server (e.g., a web server or an application server), and may be fetched by a speech engine (e.g., to navigate through a call flow). Automatic generation of VXML document(s) may help reduce the development time, the development cost, and/or manual input errors for speech recognition IVR applications.

Figure 1:
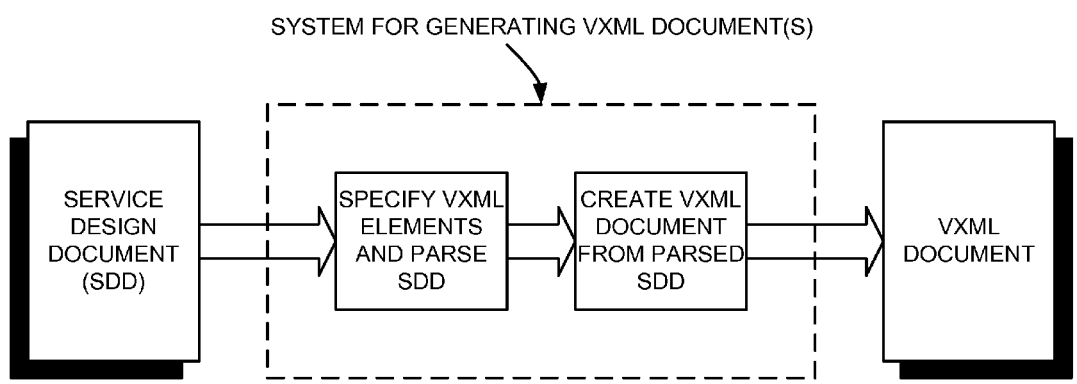
FIG. 1 is a diagram of an overview of an exemplary implementation described herein.

For example, in one implementation, as shown in FIG. 1, a system for generating VXML document(s) may receive a design document (e.g., a SDD) that specifies the VXML elements to include in the VXML document(s). The system may also parse the design document into VXML elements, and may create a VXML document(s) from the parsed VXML elements. The system may output the automatically created VXML document(s) for deployment and/or utilization by a speech engine. The systems and methods described herein may be used in any industry involved in the development of speech recognition IVR applications using VXML documents, and/or any other industry using VXML documents.

A "document," as the term is used herein, is to be broadly interpreted to include any machine-readable and machine-storable work product. A document may include, for example, a file, a combination of files, one or more files with embedded links to other files, a word processing file (e.g., a Microsoft Word® file), a spreadsheet (e.g., a Microsoft Excel® spreadsheet), a VXML document, etc. In the context of the Internet, a common document is a web page. Web pages often include textual information and may include embedded information (such as meta information, images, hyperlinks, etc.) and/or embedded instructions (such as Javascript, etc.).

A "design document," as the term is used herein, is to be broadly interpreted to include any machine-readable and machine-storable work product. A design document may include, for example, any document that includes VXML elements, information capable of being converted into VXML elements, information capable of being interpreted as VXML elements, etc.

A "VXML element," as the term is used herein, is to be broadly interpreted to include any VXML element (e.g., command) capable of being used in a VXML document. For example, the following VXML elements may be used in VoiceXML 2.0 and/or 2.1: <assign>, <audio>, <block>, <break>, <catch>, <choice>, <clear>, <data>, <disconnect>, <else>, <elseif>, <emphasis>, <enumerate>, <error>, <example>, <exit>, <field>, <filled>, <foreach>, <form>, <goto>, <grammar>, <help>, <if>, <initial>, <item>, <link>, <log>, <mark>, <menu>, <meta>, <noinput>, <nomatch>, <object>, <one-of>, <option>, <paragraph>, <param>, <phoneme>, <prompt>, <property>, <prosody>, <record>, <reprompt>, <return>, <rule>, <ruleref>, <say-as>, <script>, <send>, <sentence>, <sub>, <subdialog>, <submit>, <tag>, <throw>, <token>, <transfer>, <value>, <var>, and <vxml>.

Figure 2:
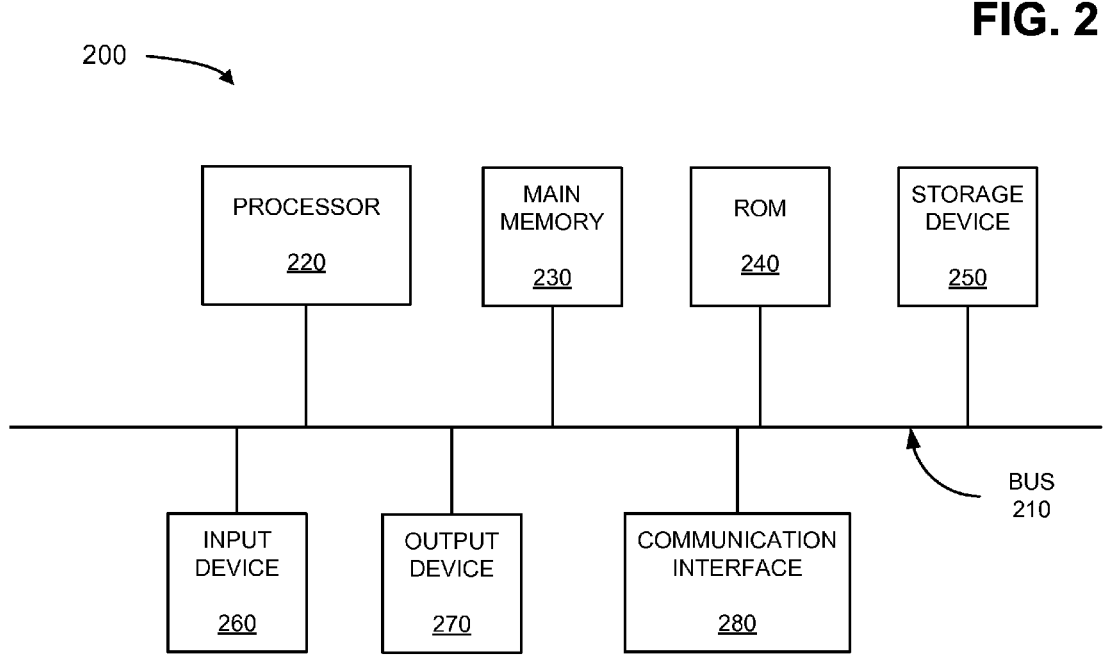
FIG. 2 is an exemplary diagram of a device in which systems and methods consistent with the principles of the invention may be implemented.

FIG. 2 is an exemplary diagram of a device 200 that may be used with aspects of the invention. A device may be defined as a personal computer, a wireless telephone, a personal digital assistant (PDA), a lap top, or another type of computation or communication device.

Device 200 may include a bus 210, a processor 220, a main memory 230, a read only memory (ROM) 240, a storage device 250, an input device 260, an output device 270, and a communication interface 280. Bus 210 may include a path that permits communication among the elements of device 200.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to device 200, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As will be described in detail below, device 200 may perform certain operations to generate a VXML document(s) from a design document(s). Device 200 may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Figure 3:
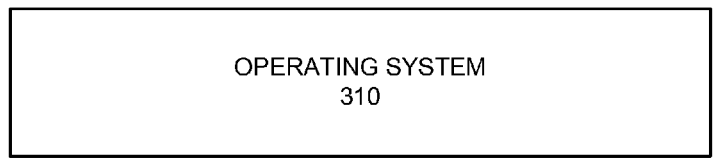
FIG. 3 is a diagram of a portion of an exemplary computer-readable medium that may be used by the device of FIG. 2.
Figure 3:
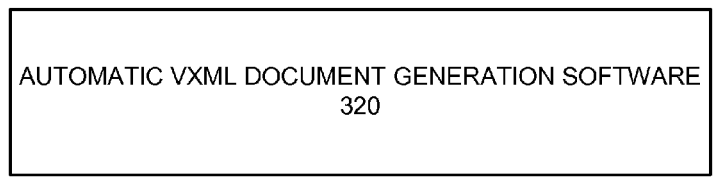
Figure 3:

FIG. 3 is a diagram of a portion of an exemplary computer-readable medium 300 that may be used by a device, such as device 200. In one implementation, computer-readable medium 300 may correspond to memory 230 of device 200. The portion of computer-readable medium 300 illustrated in FIG. 3 may include an operating system 310, automatic VXML document generation software 320, and VXML document editor software 330. Automatic VXML document generation software 320 and/or VXML document editor software 330 may be included in operating system 310 or may be separate from operating system 310. VXML document editor software 330 may be included in automatic VXML document generation software 320 or may be separate from automatic VXML document generation software 320.

Operating system 310 may include operating system software, such as the Microsoft Windows®, Apple MAC OS®, Linux®, Unix®, IBM OS/2®, and/or operating systems for personal digital assistants, cell phones, or other types of computation or communication devices.

Automatic VXML document generation software 320 may include an executable object or process. Device 200 may obtain the executable object or process from a server or from a disk, tape, network, CD-ROM, etc. Alternatively, the executable object or process may be pre-installed on device 200.

Automatic VXML document generation software 320 may permit automatic generation of a VXML document(s) from a design document(s). Automatic VXML document generation software 320 may be automatically activated upon initiation of operating system 310. Alternatively, automatic VXML document generation software 320 may be activated when instructed by a user. In either case, automatic VXML document generation software 320 may permit automatic generation of a VXML document(s) from a design document(s), as will be described below.

VXML document editor software 330 may include an executable object or process. Device 200 may obtain the executable object or process from a server or from a disk, tape, network, CD-ROM, etc. Alternatively, the executable object or process may be pre-installed on device 200.

VXML document editor software 330 may permit editing of a VXML document(s). VXML document editor software 330 may operate in conjunction with automatic VXML document generation software 320, and enable editing of VXML document(s) generated by software 320. In another implementation, VXML document editor software 330 may be part of automatic VXML document generation software 320. In this latter implementation, automatic VXML document generation software 320 may perform the functions of VXML document editor software 330. In yet another implementation, VXML document software 330 may be a process separate from operating system 310 and/or automatic VXML document generation software 320.

VXML document editor software 330 may be automatically activated upon initiation of operating system 310 and/or automatic VXML document generation software 320. Alternatively, VXML document editor software 330 may be activated when instructed by a user. In either case, VXML document editor software 330 may permit editing of VXML document(s), as will be described below.

Figure 4A:
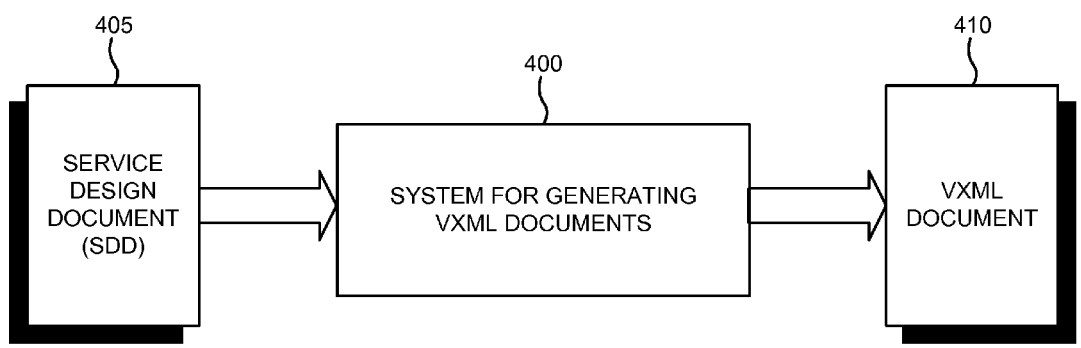
FIG. 4A is a diagram of a system for generating a VXML document(s) from a design document(s) according to an exemplary implementation.

FIG. 4A is an exemplary diagram of a system 400 for generating a VXML document 410 from a design document 405. According to one implementation, one or more of the functions of system 400, as described below, may be performed by a device (e.g., device 200). According to another implementation, one or more of these functions may be performed by an entity separate from device 200, such as a computer associated with device 200.

FIG. 4B is a diagram of an exemplary portion of design document 405. Design document 405 may include a variety of information, including an application summary, application call flows, application specification requirements, and/or a dialog design. As shown in FIG. 4B, a portion of a dialog design section of design document 405 may include a variety of information, including the dialog states that may describe the dialog interaction to be used in an IVR application. The dialog design section may also include tables containing VXML element properties. For example, the dialog design section may include a previous dialog state section 415 (e.g., a "GetPIN" section), a pre-condition and action section 420, and/or a prompts section 425. Prompts section 425 may be divided into columns (e.g., a condition column, a name column, a wording column, and a barge-in column). As further shown in FIG. 4B, prompts section 425 may include a prompt 430 to play during an initial dialog state (e.g., during an initial customized state for a PIN having a fixed number of digits), a prompt 435 to play during another initial dialog state (e.g., during an initial customized state for a PIN having a variable number of digits), and a timeout prompt 440.

Although FIG. 4B shows exemplary information that may be included in design document 405, in other implementations, design document 405 may include fewer or additional types of information. For example, design document 405 may include the kind of grammar (e.g., dates, currency, phone, etc.) to be activated during the dialog state, prompts to play during transitioning from a previous dialog state, prompts to play during an initial dialog state, "no speech" timeout prompts, "no match" timeout prompts, "help" prompts, a next dialog state, etc.

FIGS. 4C and 4D are diagrams of exemplary portions of VXML document 410. VXML document 410 may include a variety of information, including any of the specifications recommended by the W3C and defined in VoiceXML 2.0 and/or 2.1. VXML document 410 may be a static document (i.e., the pages of VXML document may be called directly), or a dynamic document. Dynamic VXML documents, for example, may be in the form of servlets, java server pages, active server pages, etc. In one example, if a user calls an IVR application, the application may forward the user to a VXML document, as may be specified by the IVR call flow. A voice browser may render the VXML document, may follow the rules specified by the WC3 in VoiceXML 2.0 and/or 2.1, and may play the appropriate prompts. For example, a user may call an IVR application, and, in one of the dialog states, the IVR application may prompt the user to input a seven digit account identification. For this dialog state, a "no input" event may be defined as when there is no input from the user for four seconds. In other words, if the user does not key in or speak the account identification after four seconds, the voice browser may activate the "no input" event and may play the appropriate prompts specified by a <noinput> VXML element in the VXML document.

As shown in FIGS. 4C and 4D, a portion of VXML document 410 may include an introductory section 445 referring to the VXML version used for the VXML document. VXML document 410 may also include a block section 450 that may provide information relating to the initial prompt to be played. As further shown in FIG. 4C, the portion of VXML document 410 may also include a field type section 455 that may specify the input type for the user's input, a first prompt section 460 relating to a "no input" event, and a second prompt section 465 relating to a "no input" event. As further shown in FIG. 4D, the portion of VXML document 410 may include a script section 470 that provides a list of variables and the audio prompts (e.g., "For more information say help") associated with each variable.

Although FIGS. 4C and 4D show exemplary information that may be included in VXML document 410, in other implementations, VXML document 410 may include fewer or additional types of information. For example, VXML document 415 may include any of the VXML elements described above.

Figure 5:
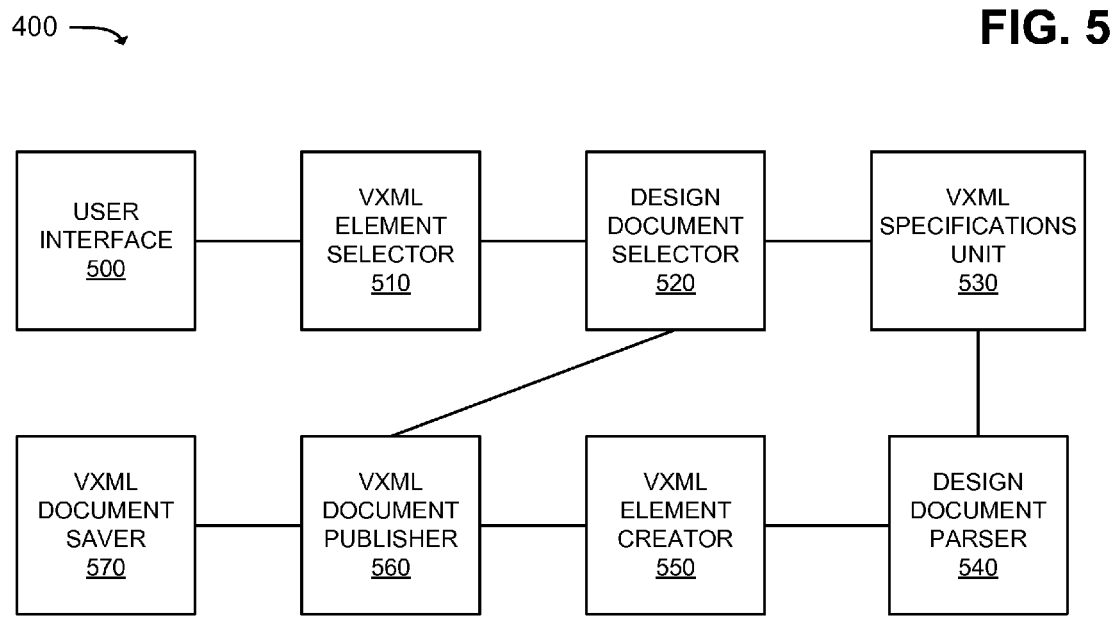
FIG. 5 is a functional diagram of the components of the exemplary system of FIG. 4A.

FIG. 5 is a functional diagram of the components of system 400. As shown in FIG. 5, system 400 may include a user interface 500, a VXML element selector 510, a design document selector 520, a VXML specifications unit 530, a design document parser 540, a VXML element creator 550, a VXML document publisher 560, and a VXML document saver 570. System 400 may alternatively include other components and/or component interrelations not shown in FIG. 5.

User interface 500 may display an interface that permits a user to interact with system 400. VXML element selector 510 may permit selection of different VXML elements (e.g., any of the VXML elements defined above) for a dialog design described in a design document (e.g., design document 405). For example, if the dialog design includes a <field> VXML element, then the user, via VXML element selector 510, may select "yes" for the field element and may also select the type of field (e.g., digits, Boolean, etc.). In another example, the dialog design portion of the design document may require the user to enter digits between "4" and "8." This may be accomplished with VXML element selector 510 by choosing the field type "digits" and entering the minimum and maximum number of digits as "4" and "8."

Document design selector 520 may permit selection of a design document, and VXML specifications unit 530 may specify the VXML elements and the relationships between them. Design document parser 540 may parse the design document into, e.g., VXML elements, prompts, other properties, etc. The individual elements of the parsed design document may be used by VXML element creator 550 to assemble a VXML document(s). VXML document publisher 560 may display the created VXML document and may permit editing of the VXML document. VXML document publisher 560 may also permit selection of another design document (e.g., via design document selector 520). The VXML document may be named and saved by VXML document saver 570.

Although FIG. 5 shows user interface 500, VXML element selector 510, design document selector 520, VXML specifications unit 530, design document parser 540, VXML element creator 550, VXML document publisher 560, and VXML document saver 570 as separate components, the tasks of such components may be performed by a single processor (e.g., processor 220) or multiple tasks may be implemented by a single software component.

FIGS. 6-13 are diagrams illustrating the components of the exemplary system (e.g., system 400) in additional detail.

Figure 6:
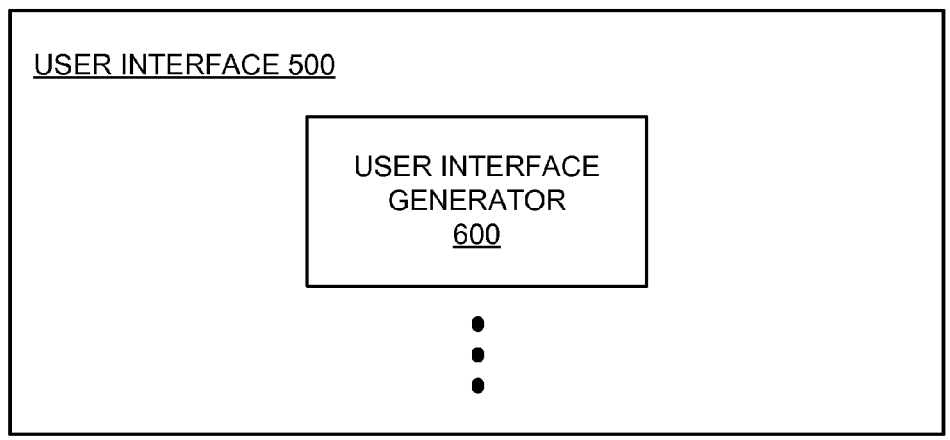
FIG. 6 is a diagram of a user interface of the exemplary system of FIGS. 4A and 5.

User interface 500, as shown in FIG. 6, may perform a variety of tasks to aid in the generation of VXML document (s). For example, in one implementation, user interface 500 may include a user interface generator 600 that generates a user interface (e.g., a graphical user interface provided on output device 270 of device 200) for use by the other components of system 400. The user interface may be a stand alone application, a web page, a client/server application, etc. The user interface may be written in a variety of programming languages, including, for example, any of the object oriented programming languages (e.g., java, c++, c#, visual basic, etc.).

The user interface, via VXML element selector 510, may provide a display that enables selection of different VXML elements to be included in the VXML document(s) (e.g., the VXML elements set forth in the dialog design portion of the design document). The user interface, via design document selector 520, may provide a display that enables selection of the design document. If a design document is selected, the components of system 400 (e.g., VXML specifications unit 530, design document parser 540, and VXML element creator 550) may generate a VXML document(s), and the user interface, in conjunction with VXML document publisher 560, may display the generated VXML document(s). The user interface, via VXML document publisher 560, may provide a display that permits the VXML document(s) to be edited and/or may permit selection of another design document. In conjunction with VXML document saver 570, the user interface may provide a display that permits the generated VXML document(s) to be named and/or saved.

Although FIG. 6 shows an exemplary task performed by user interface 500, in other implementations, user interface 500 may perform additional tasks that may be used to generate VXML document(s).

Figure 7:
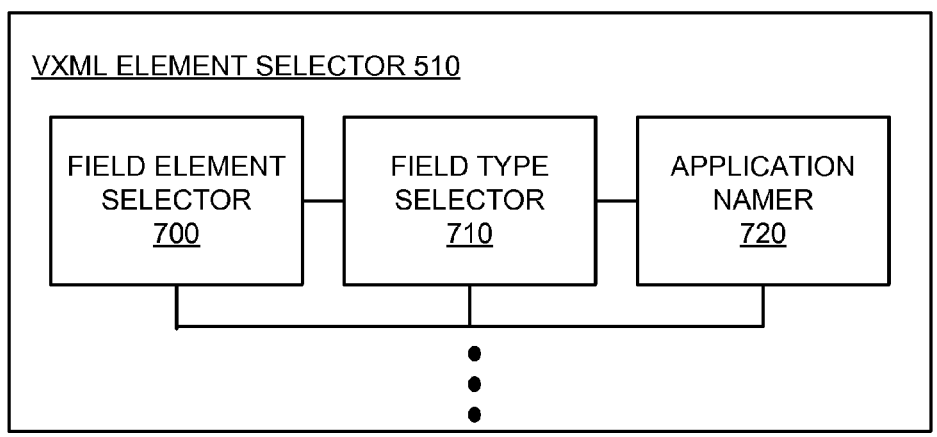
FIG. 7 is a diagram of a VXML element selector of the exemplary system of FIGS. 4A and 5.

VXML element selector 510, as shown in FIG. 7, may perform a variety of tasks to aid in the generation of VXML document(s). For example, in one implementation, VXML element selector 510 may include a field element selector 700 that permits selection of a field element, a field type selector 710 that permits selection of a field type for a selected field element, an application namer 720 that permits specification of an application name associated with a selected field element, etc. VXML element selector 510 may aid the selection of VXML elements to conform to VoiceXML 2.0 and/or 2.1. For example, VXML element selector 510 may permit selection of a field element (e.g., via field element selector 700) if a dialog design portion of a design document includes a field element. If a field element is selected, then VXML element selector 510 (via field type selector 710) may permit selection of what type of field (e.g., digits, Boolean, currency, date, etc.) may be used for the field element. For example, if the dialog design portion may require that the IVR application user enter a date, then VXML element selector 510 may enable selection of the field type as a "date."

Although FIG. 7 shows exemplary tasks performed by VXML element selector 510, in other implementations, VXML element selector 510 may perform additional tasks that may be used to generate VXML document(s). Furthermore, although FIG. 7 shows the components of VXML element selector 510 as interconnected, in other implementations, the components of VXML element selector 510 may be separate, non-interconnected components.

Figure 8:
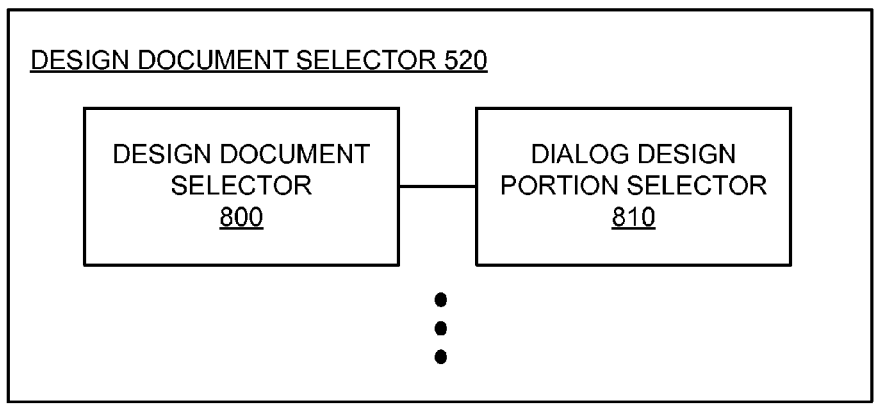
FIG. 8 is a diagram of a design document selector of the exemplary system of FIGS. 4A and 5.

Design document selector 520, as shown in FIG. 8, may perform a variety of tasks to aid in the generation of VXML document(s). For example, in one implementation, design document selector 520 may include a design document selector 800 that permits selection of a design document (e.g., a SDD), a dialog design portion selector 810 that permits selection of a dialog design portion of a selected design document, etc. Design document selector 520 may perform such tasks in conjunction with the user interface (e.g., user interface 500), or over a command line. The dialog design portion of the design document may include the VXML elements for a given dialog state.

Although FIG. 8 shows exemplary tasks performed by design document selector 520, in other implementations, design document selector 520 may perform additional tasks that may be used to generate VXML document(s). Furthermore, although FIG. 8 shows the components of design document selector 520 as interconnected, in other implementations, the components of design document selector 520 may be separate, non-interconnected components.

Figure 9:
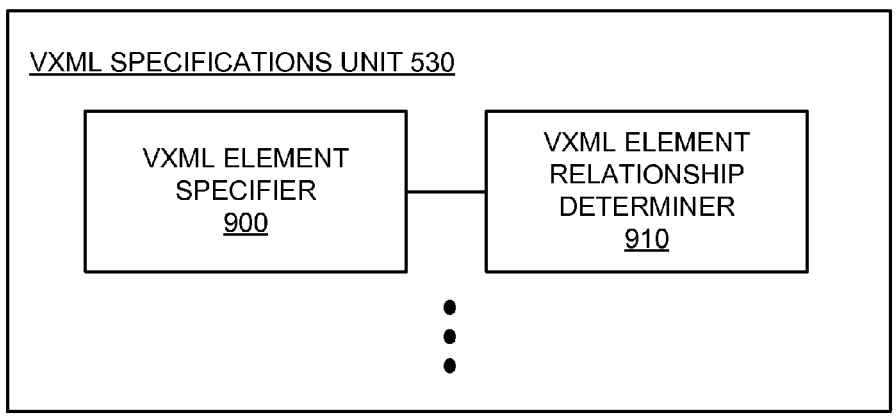
FIG. 9 is a diagram of a VXML specifications unit of the exemplary system of FIGS. 4A and 5.

VXML specifications unit 530, as shown in FIG. 9, may perform a variety of tasks to aid in the generation of VXML document(s). For example, in one implementation, VXML specifications unit 530 may include a VXML element specifier 900 that specifies the VXML elements provided in a design document, a VXML element relationship determiner 910 that determines the relationships between the specified VXML elements, etc. For example, since the <vxml> element may be a root element for the VXML document, VXML specifications unit 530 may add the <vxml> element as the root element for the VXML document(s) generated by system 400. In another example, since a parent element for a <field> element (this element may create an interactive dialog between a user and the IVR application) may be a <form> element, if a <field> element is selected, VXML specifications unit 530 may add a <form> element as a parent element for the <field> element.

Although FIG. 9 shows exemplary tasks performed by VXML specifications unit 530, in other implementations, VXML specifications unit 530 may perform additional tasks that may be used to generate VXML document(s). Furthermore, although FIG. 9 shows the components of VXML specifications unit 530 as interconnected, in other implementations, the components of VXML specifications unit 530 may be separate, non-interconnected components.

Figure 10:
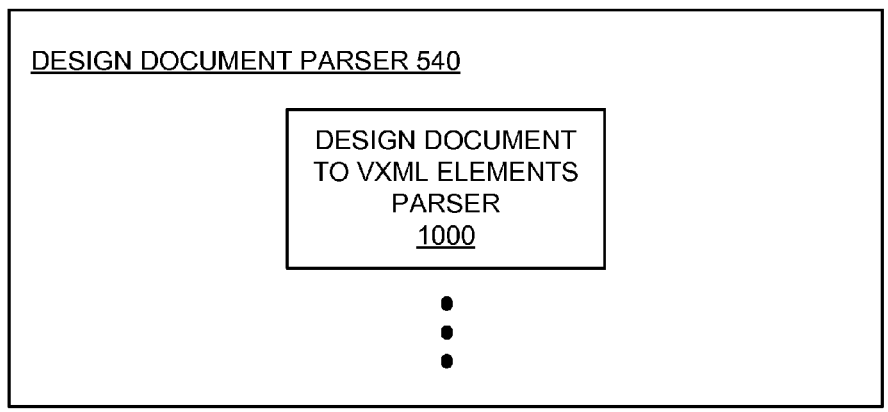
FIG. 10 is a diagram of a design document parser of the exemplary system of FIGS. 4A and 5.

Design document parser 540, as shown in FIG. 10, may perform a variety of tasks to aid in the generation of VXML document(s). For example, in one implementation, design document parser 540 may include a design document to VXML elements parser 1000 that parses the design document into VXML elements, prompts, and other properties, etc. For example, if the design document is in the form of an Excel document, design document parser 540 may use an Excel parser to break down the Excel document into individual data elements. In another example, if the design document is in the form of a document with a table(s), design document parser 540 may parse the table(s) in the document into individual data elements.

Although FIG. 10 shows an exemplary task performed by design document parser 540, in other implementations, design document parser 540 may perform additional tasks that may be used to generate VXML document(s).

Figure 11:
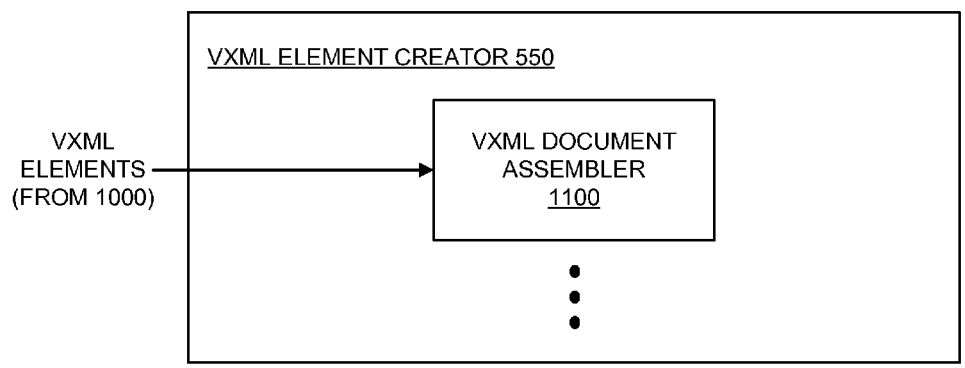
FIG. 11 is a diagram of a VXML element creator of the exemplary system of FIGS. 4A and 5.

VXML element creator 550, as shown in FIG. 11, may perform a variety of tasks to aid in the generation of VXML document(s). For example, in one implementation, VXML element creator 550 may include a VXML document assembler 1100 that may receive VXML elements (e.g., from parser 1000) and may create a VXML document(s) (e.g., VXML document 410) from the VXML elements. In one example, VXML document assembler 1100 may create a VXML document that may contain the root <vxml> element and other children VXML elements specified in the dialog design portion of the design document (e.g., design document 405).

Although FIG. 11 shows an exemplary task performed by VXML element creator 550, in other implementations, VXML element creator 550 may perform additional tasks that may be used to generate VXML document(s).

Figure 12:
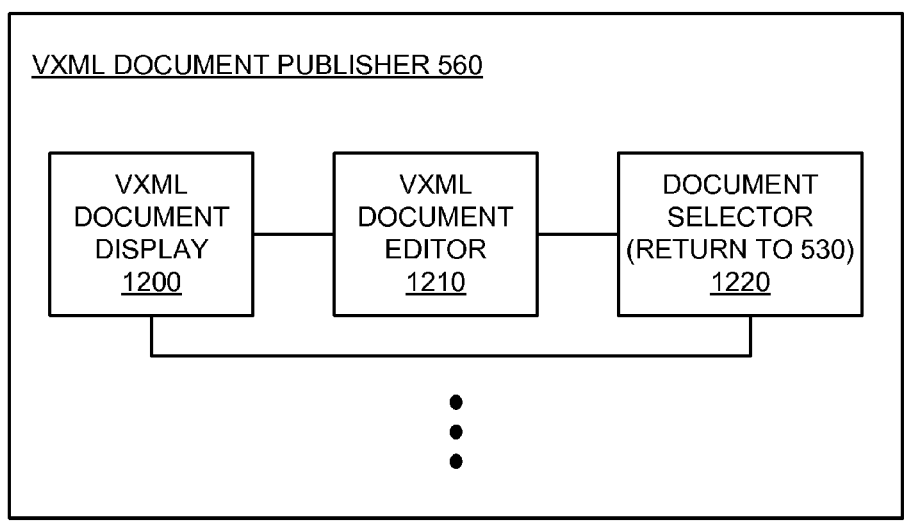
FIG. 12 is a diagram of a VXML document publisher of the exemplary system of FIGS. 4A and 5.

VXML document publisher 560, as shown in FIG. 12, may perform a variety of tasks to aid in the generation of VXML document(s). For example, in one implementation, VXML document publisher 560 may include a VXML document display 1200 that may display (e.g., in conjunction with user interface 500) the VXML document(s) created by VXML element creator 550. In other implementations, VXML document publisher 560 may include a VXML document editor 1210 that may permit editing of the VXML document(s), a document selector 1220 that may permit selection of alternative or additional design documents to be used to create a VXML document(s), etc.

Although FIG. 12 shows exemplary tasks performed by VXML document publisher 560, in other implementations, VXML document publisher 560 may perform additional tasks that may be used to generate VXML document(s). Furthermore, although FIG. 12 shows the components of VXML document publisher 560 as interconnected, in other implementations, the components of VXML document publisher 560 may be separate, non-interconnected components.

Figure 13:
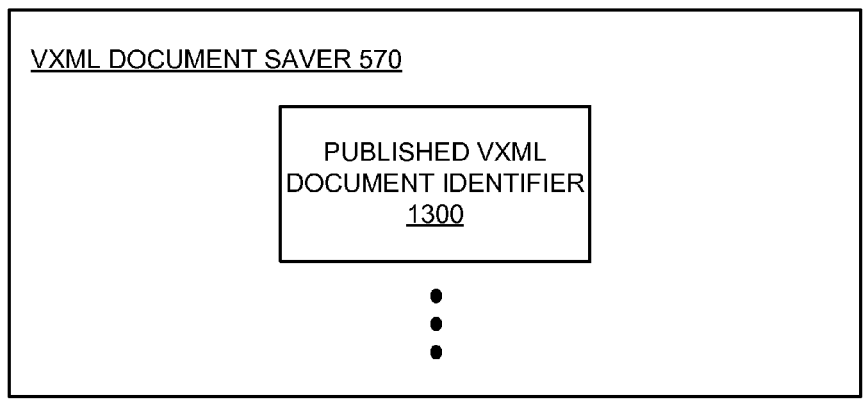
FIG. 13 is a diagram of a VXML document saver of the exemplary system of FIGS. 4A and 5.

VXML document saver 570, as shown in FIG. 13, may perform a variety of tasks to aid in the generation of VXML document(s). For example, in one implementation, VXML document saver 570 may include a published VXML document identifier 1300 that may permit a user to save the VXML document(s) created by VXML document publisher 560, etc. In another example, VXML document saver 570 may permit a user to select a name and an extension for the VXML document(s). A default extension for the VXML document(s) may be "vxml".

Although FIG. 13 shows an exemplary task performed by VXML document saver 570, in other implementations, VXML document saver 570 may perform additional tasks that may be used to generate VXML document(s).

Figure 14A:
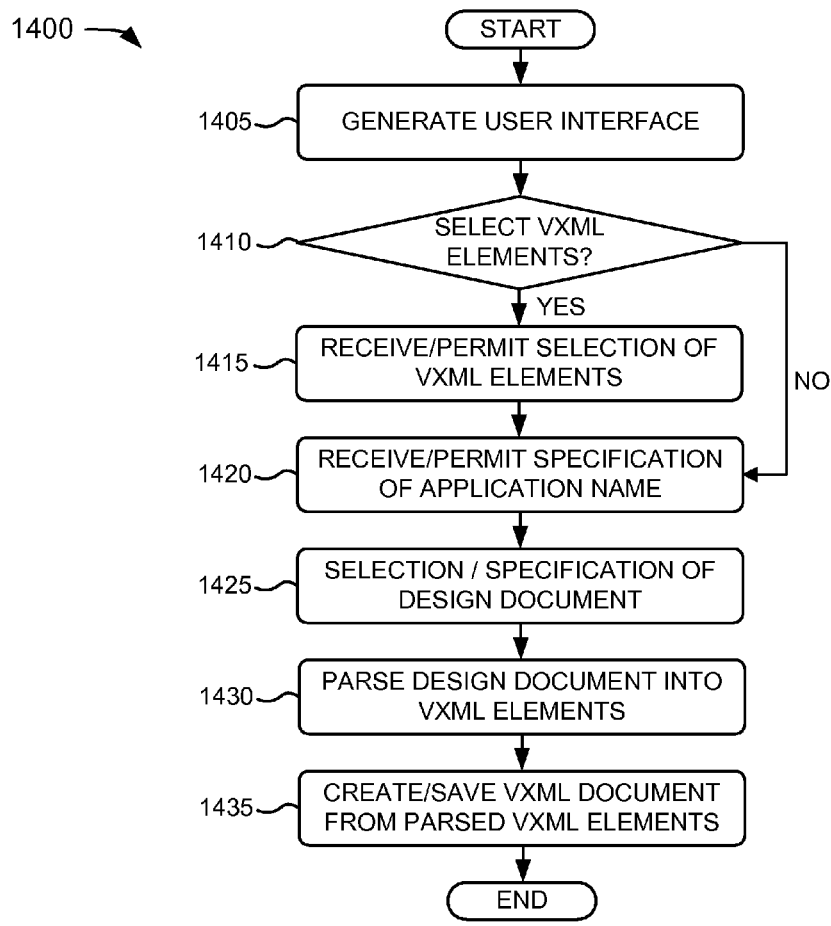
FIGS. 14A and 14B provide a flowchart of an exemplary process for generating a VXML document(s) from a design document(s).
Figure 14B:
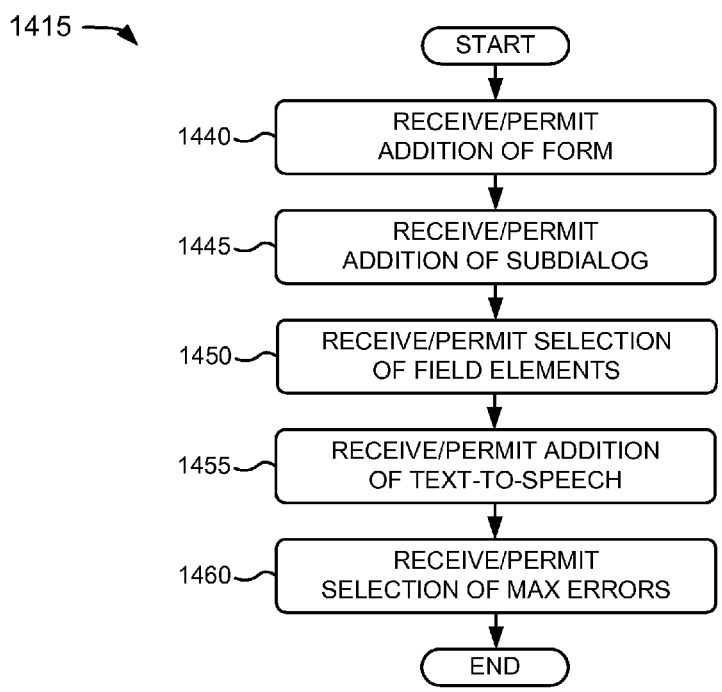

FIGS. 14A and 14B provide a flowchart of an exemplary process for generating a VXML document(s) from a design document(s). As shown in FIG. 14A, a process 1400 for generating a VXML document(s) from a design document(s) may begin with the generation of a user interface (block 1405). For example, in one implementation described above in connection with FIG. 6, user interface 500 may include user interface generator 600 that generates a user interface for use by the other components of system 400. The user interface, via other components of system 400, may enable selection of different VXML elements to be included in the VXML document(s), may enable selection of the design document, may display the generated VXML document(s), may permit the VXML document(s) to be edited, may permit selection of another design document, and/or may permit the generated VXML document(s) to be named and/or saved.

Process 1400 may determine whether VXML elements are to be selected by a user (block 1410). If VXML elements are to be selected by the user (block 1410—YES), then process 1400 may receive or permit selection of VXML elements (block 1415). Otherwise (block 1410—NO), process 1400 may receive or permit specification of an application name (block 1420). For example, in one implementation described above in connection with FIG. 7, VXML element selector 510 may include field element selector 700 that permits selection of a field element, field type selector 710 that permits selection of a field type for the selected field element, application namer 720 that permits specification of an application name associated with the selected field element, etc. VXML element selector 510 may aid the selection of VXML elements to conform to VoiceXML 2.0 and/or 2.1.

As further shown in FIG. 14A, process 1400 may receive or permit selection and/or specification of a design document (block 1425). For example, in one implementation described above in connection with FIG. 8, design document selector 520 may include design document selector 800 that may permit selection of a design document (e.g., a SDD), and dialog design portion selector 810 that may permit selection of a dialog design portion of a selected design document. In another implementation described above in connection with FIG. 9, VXML specifications unit 530 may include VXML element specifier 900 that may specify the VXML elements provided in the design document, a VXML element relationship determiner 910 that may determine the relationships between the specified VXML elements, etc.

Process 1400 may parse the design document into VXML elements (block 1430). For example, in one implementation described above in connection with FIG. 10, design document parser 540 may include design document to VXML elements parser 1000 that parses the design document into VXML elements, prompts, and other properties, etc. In one example, if the design document is in the form of an Excel document, design document parser 540 may use an Excel parser to break down the Excel document into individual Excel elements. In another example, if the design document is in the form of a document with a table(s), design document parser 540 may parse the table(s) in the document into individual elements.

As further shown in FIG. 14A, process 14A may create and/or save the VXML document(s) assembled from the parsed VXML elements (block 1435). For example, in one implementation described above in connection with FIG. 11, VXML element creator 550 may include VXML document assembler 1100 that may receive VXML elements (e.g., from parser 1000) and may create a VXML document(s) (e.g., VXML document 410) from the VXML elements, etc. In another implementation described above in connection with FIG. 12, VXML document publisher 560 may include VXML document display 1200 that may display the VXML document(s) created by VXML element creator 550, VXML document editor 1210 that may permit editing of the VXML document(s), document selector 1220 that may permit selection of alternative or additional design documents to be used to create a VXML document(s), etc. In still another implementation described above in connection with FIG. 13, VXML document saver 570 may include published VXML document identifier 1300 that may permit a user to save the VXML document(s) created by VXML document publisher 560, etc. In one example, VXML document saver 570 may permit a user to select a name and an extension for the VXML document(s).

Process block 1415 (FIG. 14A) of process 1400 may include the blocks shown in FIG. 14B. Thus, process block 1415 may receive or permit addition of a form element (block 1440). For example, in one implementation described above in connection with FIG. 7, VXML element selector 510 may permit selection of a form element (a form element may contain the core logic of a voice application, including grammars, prompts, and code to be executed based on user response) for the VXML document to be generated. Process block 1415 may receive or permit addition of a subdialog element (block 1445). For example, in one implementation described above in connection with FIG. 7, VXML element selector 510 may receive or permit selection of a subdialog element for the VXML document to be generated.

As further shown in FIG. 14B, process block 1415 may receive or permit selection of field elements (block 1450). For example in one implementation described above in connection with FIG. 7, VXML element selector 510 may include field element selector 700 that permits selection of a field element and field type selector 710 that permits selection of a field type for the selected field element for the VXML document to be generated. Process block 1415 may receive or permit addition of text-to-speech (block 1455). For example in one implementation described above in connection with FIG. 7, VXML element selector 510 may permit selection of text-to-speech for the VXML document to be generated.

Process block 1415 may receive or permit selection of the maximum number of errors for a "no input" event and/or a "no match" event (block 1460). For example in one implementation described above in connection with FIG. 7, VXML element selector 510 may permit selection of the maximum number of errors for a "no input" event (e.g., a IVR application user is unresponsive) and/or a "no match" event (e.g., an IVR application user is not providing the correct information) for the VXML document to be generated.

Implementations described herein may provide systems and methods for automatically generating a VXML document (s) from a dialog design portion of a design document(s) for a speech recognition IVR application. For example, the systems and methods may permit specification of the VXML elements in the design document, and may automatically parse the design document to extract the VXML elements from the design document. The systems and methods may assemble a VXML document(s) based on the extracted VXML elements. Automatic generation of VXML document (s) may help reduce the development time, the development cost, and/or manual input errors for speech recognition IVR applications.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 14A and 14B, the order of the acts may be modified in other implementations consistent with principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, at a device, selection of a voice extensible markup language (VXML) element for a VXML document, where receiving the selection includes at least one of:
      receiving selection of at least one field element for the VXML document,
      receiving selection of at least one field type for the field element, or
      receiving specification of an application name for the VXML document;
   receiving, from a user, a user-selected design document at the device;
   receiving, from the user, selection of a dialog design portion of the user-selected design document at the device;
   parsing the dialog design portion of the design document with the device into at least one VXML element based on the received selection of the VXML element; and
   creating the VXML document with the device that includes the parsed VXML element.

2. The method of claim 1, where the design document includes tables and the parsing includes parsing the tables of the design document into the at least one VXML element.

3. The method of claim 1, further comprising:
   generating a user interface to enable selection of the design document and display of the VXML document.

4. The method of claim 1, further comprising:
   specifying the VXML element in the design document.

5. The method of claim 1, further comprising:
   displaying the VXML document;
   enabling editing of the displayed VXML document; and
   enabling selection of another design document for incorporation into the VXML document.

6. The method of claim 1, further comprising:
   storing the VXML document.

7. The method of claim 1, where the design document comprises at least one of a spreadsheet or a word processing document.

8. The method of claim 1, where the VXML document is part of a speech recognition interactive voice recognition (IVR) application.

9. The method of claim 1, where the VXML element comprises at least one of:
   a form element;
   a subdialog element;
   a field element;
   a text-to-speech element;
   a maximum number of errors for a no input event; or
   a maximum number of errors for a no match event.

10. A system comprising:
    a memory to store a plurality of instructions; and
    a processor to execute the plurality of instructions to implement:
       a VXML element selector that enables selection of one or more voice extensible markup language (VXML) elements for a VXML document, and enables selection of one or more of at least one field element for the VXML document, at least one field type for the field element, or an application name for the VXML document,
       a design document parser that:
          receives, from a user, a user-selected design document,
          receives, from the user, selection of a dialog design portion of the user-selected design document, and
          parses the dialog design portion of the design document into at least one voice extensible markup language (VXML) VXML element based on the selection of one or more VXML elements, and
       a VXML document creator that creates the VXML document that includes the parsed VXML element.

11. The system of claim 10, further comprising:
    a user interface that enables selection of the design document and enables display of the VXML document.

12. The system of claim 10, further comprising:
    a VXML specifications unit that specifies the VXML element in the design document.

13. The system of claim 10, further comprising:
    a VXML document publisher that displays the VXML document and enables editing of the VXML document.

14. The system of claim 13, the VXML document publisher further enables selection of another design document for incorporation into the VXML document.

15. The system of claim 10, further comprising:
VXML document storage that stores the VXML document.

16. A system comprising:
means, implemented using hardware, for receiving a selection of one or more voice extensible markup language (VXML) elements for a VXML document, where the means for receiving the selection of the one or more VXML elements includes:
  means for enabling selection of at least one field element, at least one field type, or a name for the VXML document;
means, implemented using hardware, for receiving, from a user, a user-selected design document;
means, implemented using hardware, for receiving, from the user, selection of a dialog design portion of the user-selected design document;
means, implemented using hardware, for parsing the dialog design portion of the design document into VXML elements based on the selection of the one or more VXML elements; and
means, implemented using hardware, for creating the VXML document from the parsed VXML elements.

17. A system comprising:
a memory to store a plurality of instructions; and
a processor to execute instructions in the memory to:
  receive a selection of one or more voice extensible markup language (VXML) elements for a VXML document, where the selection of the one or more VXML elements includes:
    selection of one or more of at least one field element, at least one field type, or a name for the VXML document,
  receive, from a user, a user-selected design document,
  receive, from the user, selection of a dialog design portion of the user-selected design document, where the dialog design portion is stored in cells of a spreadsheet or stored in a table of a word processing document,
  parse the dialog design portion of the design document into VXML elements based on the received selection of the one or more VXML elements, and
  create the VXML document from the parsed VXML elements.

18. A computer-readable memory device that stores computer-executable code, the computer readable memory device comprising:
instructions to receive, at a device, a selection of one or more voice extensible markup language (VXML) elements for a VXML document, where the instructions to receive the selection of the one or more VXML elements include:
  instructions to receive selection of one or more of at least one field element, at least one field type, or a name for the VXML document;
instructions to receive, from a user, a user-selected design document at the device,
instructions to receive, from the user, selection of a dialog design portion of the user-selected design document at the device,
instructions to parse the dialog design portion of the design document with the device into at least one VXML element based on the received selection of the one or more VXML elements, and
instructions to create the VXML document with the device that includes the parsed VXML element.

* * * * *